US006487852B1

(12) United States Patent
Murphy et al.

(10) Patent No.: US 6,487,852 B1
(45) Date of Patent: Dec. 3, 2002

(54) METHOD AND APPARATUS FOR CONTROLLING REACTANT INJECTION INTO AN ACTIVE LEAN NOX CATALYST

(75) Inventors: Kevin Richard Murphy, Troy, MI (US); Michiel J. van Nieuwstadt, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,444

(22) Filed: Sep. 4, 2001

(51) Int. Cl.⁷ ................................................ F01N 3/00
(52) U.S. Cl. .......................... 60/286; 60/277; 60/274; 60/295; 73/119 A
(58) Field of Search ...................... 60/274, 286, 295, 60/303, 277; 73/119 A

(56) References Cited

U.S. PATENT DOCUMENTS

| | | | |
|---|---|---|---|
| 5,201,802 A | 4/1993 | Hirota et al. | |
| 5,369,956 A | 12/1994 | Daudel et al. | |
| 5,410,873 A | 5/1995 | Tashiro | |
| 5,428,956 A | 7/1995 | Maus et al. | |
| 5,540,047 A | 7/1996 | Dahlheim et al. | |
| 5,628,186 A | 5/1997 | Schmelz | |
| 5,643,536 A | 7/1997 | Schmelz | |
| 5,706,652 A | 1/1998 | Sultan | |
| 5,751,602 A | 5/1998 | Maus et al. | |
| 5,806,310 A | * 9/1998 | Daidou et al. | 60/286 |
| 5,831,145 A | 11/1998 | Logothetis et al. | |
| 5,842,341 A | 12/1998 | Kibe | |
| 5,845,487 A | 12/1998 | Fraenkle et al. | |
| 5,941,067 A | 8/1999 | Hirota et al. | |
| 5,950,422 A | 9/1999 | Dolling | |
| 6,001,318 A | 12/1999 | Tillaart et al. | |
| 6,016,653 A | 1/2000 | Glassey et al. | |
| 6,017,503 A | 1/2000 | Kato et al. | |
| 6,079,203 A | 6/2000 | Wakamoto | |
| 6,119,448 A | 9/2000 | Emmerling et al. | |
| 6,131,388 A | * 10/2000 | Sasaki et al. | 60/286 |
| 6,134,883 A | 10/2000 | Kato et al. | |
| 6,167,698 B1 | * 1/2001 | King et al. | 60/286 |
| 6,357,226 B2 | 3/2002 | Borland | |

* cited by examiner

Primary Examiner—Thomas Denion
Assistant Examiner—Binh Tran
(74) Attorney, Agent, or Firm—Allan J. Lippa; John D. Russell

(57) ABSTRACT

A method and system for determining whether a desired amount of hydrocarbon is actually injected into an engine exhaust to react with NOx in such engine exhaust. The reaction is facilitated with a catalyst downstream of the hydrocarbon injection. The method and system measure a first temperature difference across the catalyst during the reaction. The first temperature difference is compared with an expected temperature difference across the catalyst during the reaction. The difference in exotherm is used to adjust the injected HC quantity, and diagnose injector failures.

5 Claims, 1 Drawing Sheet

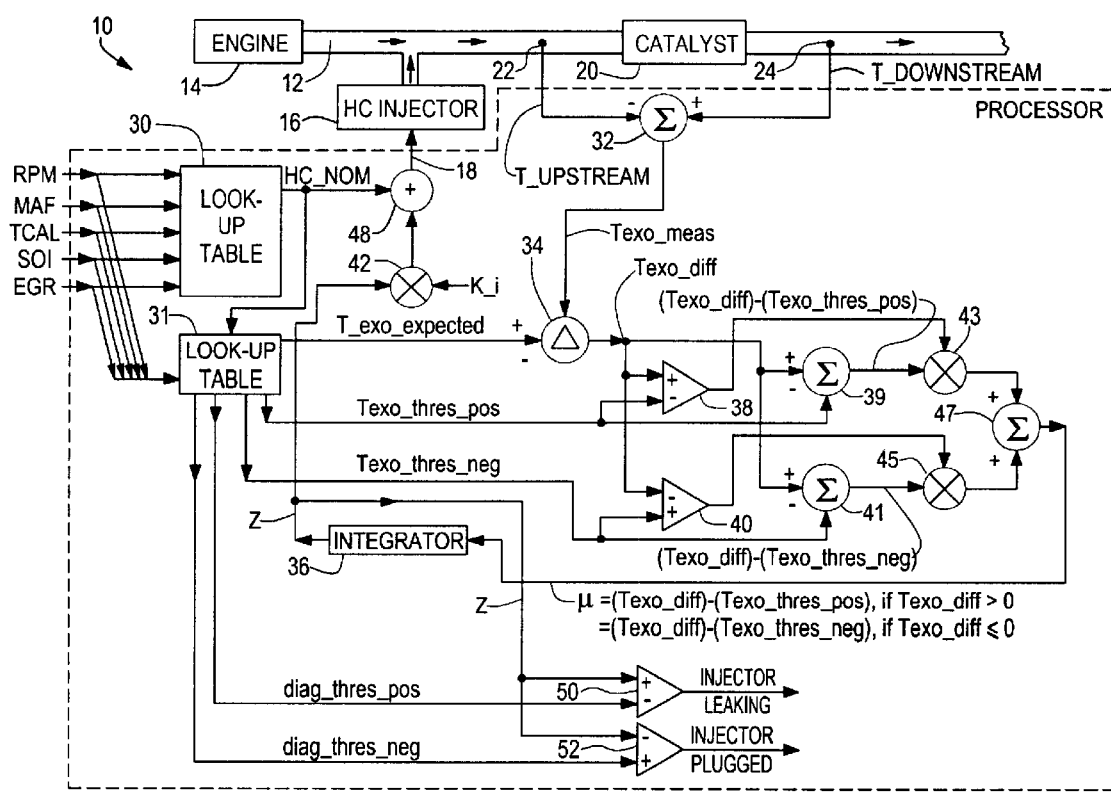

METHOD AND APPARATUS FOR CONTROLLING REACTANT INJECTION INTO AN ACTIVE LEAN NOX CATALYST

BACKGROUND OF THE INVENTION

This invention relates to methods and apparatus for reducing NOx in engine exhaust and more particularly to method and apparatus for reducing NOx in engine exhaust by injecting a reactant to react with such engine exhaust.

As is known in the art, lean burn engines (e.g., diesel and DISI engines) provide great fuel efficiency compared to stoichiometric spark ignited engines at the expense of more complicated exhaust after-treatment. More particularly, one such after-treatment is the reduction of engine exhaust NOx. Lean NOx catalysts (ALNCs) are typically utilized to reduce tail pipe NOx emissions.

In a typical ALNC configuration, a reductant or reactant, e.g., urea or hydrocarbon, is introduced into the engine exhaust stream. In many cases, a catalyst is used to facilitate the reaction This NOx reduction arrangement is in the case of a hydrocarbon (HC) reactant essentially an open-loop arrangement because a measurement of the effectiveness of the NOx reduction is not used to adjust the amount of reactant being introduced, or injected into the engine exhaust. This open-loop arrangement includes a look-up table which stores the relationship between the desired amount of hydrocarbon injection in accordance with engine speed, engine load, EGR level, start of fuel injection, catalyst temperature and space velocity, inter alia. Typical injection strategies compute the HC quantity q1 to be injected as the product of a first function f1 (where f1 is a function itself of space velocity (SV), engine speed (RPM) and fuel quantity ) and a second function, f2, which is a function of catalyst temperature, $T_{cat}$.

More particularly, q1=f1(SV, RPM, fuel)*f2(T_cat). Thus, f1 and f2 are determined a priori to thereby compute q1. The signal representative of q1 is used as the control signal for an HC injector.

The inventors have recognized that there is no way to guarantee that the desired hydrocarbon quantity injected is actually injected since the actual hydrocarbon concentration in the engine exhaust cannot be measured. Injector uncertainty (e.g., injector plugging) may cause the actual injected quantity to be more or less than the desired quantity. We have recognized that since advanced diesel treatment packages include temperature sensors before and after the ALNC, a calculation of the exotherm across the ALNC can be performed to thereby provide an indication of whether the desired hydrocarbon quantity injected is actually injected into the engine exhaust. Also, feedgas HC may change due to engine ageing. This method allows the HC injector to compensate for such changes.

SUMMARY OF THE INVENTION

In accordance with the present invention, a method and system are provided for determining whether a desired amount of a reactant is actually injected into an engine exhaust to react with NOx in such engine exhaust. The reaction is facilitated with a catalyst downstream of the reactant injection. The method and system measure a quantity of heat generated from the reaction across the catalyst during the reaction. The measure heat quantity is compared with a quantity of heat expected to be generated across the catalyst during the reaction.

In one embodiment the quantity of heat is proportional to the temperature difference produced across the catalyst. In the case of hydrocarbon injection, the quantity of heat is the amount of heat generated by an exothermic reaction between the hydrocarbon and the O2 in the engine exhaust. This generated heat is referred to as an exotherm.

With such an arrangement, use of the pair of temperature sensors disposed across the catalyst enables a processor to detect whether a desired hydrocarbon quantity injected is actually injected into the engine exhaust.

In accordance with one embodiment, a method and system are provided for determining whether a hydrocarbon injector used to inject hydrocarbons into an engine exhaust to react with NOx in such engine exhaust is degraded. The method and system include measuring an exotherm produced across the catalyst during the reaction and comparing the measured exotherm with an expected exotherm across the catalyst during the reaction.

In one embodiment, a method and system are provided for determining whether a hydrocarbon injector used to inject hydrocarbons into an engine exhaust to react with NOx in such engine exhaust is degraded. The method and system include measuring an exotherm across the catalyst during the reaction; and determining an exotherm difference, such exotherm difference being the difference between the measured exotherm and an exotherm expected to be produced across the catalyst during the reaction.

In one embodiment, the method and system include integrating the exotherm difference over time; and comparing the integration result with predetermined level to detect whether the injector is degraded.

In accordance with another feature of the invention, a method and system are provided for controlling injection of a reactant into a substance to be reduced by such reactant. The reaction is facilitated by a catalyst. The method and system measure a quantity of heat generated from the reaction across the catalyst during the reaction. The measured heat quantity is compared with a quantity of heat expected to be generated across the catalyst during the reaction. A heat quantity difference is determined. The heat quantity difference is the difference between the measured heat quantity and the expected heat quantity difference; and adjusting the amount of reactant injection in accordance with the determined heat quantity difference.

In one embodiment, a method and system are provided for controlling injection of a reactant into an engine exhaust. The exhaust includes a substance to be reacted with the reactant to reduce such substance. The method and system included: measuring an exotherm produced during the reaction; determining an exotherm difference, such exotherm difference being a difference between the measured exotherm and an expected exotherm; and changing an amount of reactant injection by integral control if the determined exotherm difference exceeds a threshold, otherwise maintaining the amount of reactant injection level.

In one embodiment the reactant is a hydrocarbon and the quantity of heat is an exotherm (i.e., the amount of heat associated with an exothermic reaction between the hydrocarbon and substance.)

In one embodiment the substance is NOx in the engine exhaust.

In accordance with another feature of the invention, a system is provided for controlling injection of a hydrocarbon into an engine exhaust. The exhaust includes NOx to be reacted with the hydrocarbon to reduce such NOx. The system includes a pair of temperature sensors, one of such sensors being disposed upstream of a catalyst and the other one of the temperature sensors being disposed downstream of the catalyst. A hydrocarbon injector is provided for injecting, in response to a control signal, the hydrocarbon into the engine exhaust upstream of the catalyst. A look up table is included for determining a nominal portion of the control signal.

The nominal portion of the control signal represents a nominal amount of the hydrocarbon to be injected into the engine exhaust. The nominal amount is a function of a plurality of operating parameters including engine operating conditions and catalyst temperature. A variable control signal generator is provided for producing a time variable portion of the control signal. The time variable portion of the control signal is a function of a difference in temperatures measured by the pair of temperature sensors.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The single FIGURE is a functional block diagram of an engine exhaust system having a processor configured to reduce NOx in engine exhaust according to the invention.

DETAILED DESCRIPTION

Referring now to the FIGURE, an engine exhaust system 10 is shown for controlling injecting of a reactant, here hydrocarbons, into a substance, here the exhaust 12 of an engine 14. More particularly, the hydrocarbons are injected into the exhaust 12 by an injector 16, the amount of such hydrocarbon injection being in response to a control signal fed to the injector 16 on line 18. A catalyst 20 is provided downstream of the hydrocarbon injection into the engine exhaust 12 to facilitate the reaction between the hydrocarbons injected into the engine exhaust and NOx in the engine exhaust to thereby reduce such NOx.

A pair of temperature sensors 22, 24 are provided upstream and downstream of the catalyst, respectively. Temperature measurements provided by the temperature sensors 22, 24 are fed to a processor 26. The processor 26 produces the control signal on line 18 to control the amount of hydrocarbons to be injected into the engine exhaust 12.

The processor 26 includes a look up table 30 for determining a nominal portion, HC_NOM, of the control signal on line 18. The nominal portion, HC_NOM, represents a nominal amount of the hydrocarbon to be injected into the engine exhaust. The nominal amount, HC_NOM, is a function of a plurality of operating parameters including engine operating conditions and catalyst temperature, T_cat. More particularly, here the nominal portion, HC_NOM, of the control signal is a function of engine speed, engine load, EGR level, start of fuel injection (SOI), catalyst temperature, T_cat, and space velocity (SV).

The processor 26 includes a variable control signal generator for producing a time variable portion, k_i*Z(t) of the control signal on line 18, to be described in detail below. Suffice it to say here, however, that:

k_i is a constant to be described; and

Z(t) is a time variable quantity equal to the integral of the difference between a measured exotherm (Texo_meas) of the reaction between the hydrocarbon-NOx reaction in the catalyst 20 and an expected exotherm (Texo_expected) of the reaction between the hydrocarbon-NOx reaction in the catalyst 20; and where the measured exotherm is equal to the difference between the temperatures sensed by the pair of temperature sensors 22, 24.

Further, as will be described in detail below, Z(t) also provides an indication of whether the hydrocarbon injector 16 is defective, (e.g., plugged or leaking)

Thus, referring to the FIGURE, the time variable portion of the control signal k_i*Z(t) is provided by processor 26 determining the difference between the temperature sensors 22, 24 in subtractor 32 to thereby provided Texo_meas= T_downstream−T_upstream, where T_downstream is the temperature sensed by sensor 24 and T_upstream is the temperature measured by sensor 22. A look-up table 31 produces an expected exotherm, Texo_expected across the catalyst for a the nominal HC determined by the look up table 31 for the nominal HC level HC_NOM for the injector 16, and the current engine and catalyst operating conditions. If this nominal amount of HC, HC_NOM were in fact injected into the engine exhaust 12, the expected exotherm, Texo_expected, would be produced across the catalyst 20. Thus, an expected exotherm Texo_expected, is determined by the look up table based on the HC_NOM signal and the current engine and catalyst operating conditions. Any difference between the expected exotherm, Texo_expected, and the actual exotherm produced across the catalyst, Texo_meas, would result in an error signal, Texo_diff=Texo_meas−Texo_expected. This error signal Texo_diff is an exotherm difference signal. The error signal Texo_diff is determined by a subtractor 34. The error signal Texo_diff is fed to: to a pair of comparators 38, 40, as shown. Also fed top the comparators 38, 40 are upper and lower threshold signals Texo_thres_pos and Texo_thres_neg, respectively, provided by the look up table 30 in accordance with the engine operating parameters and the catalyst temperature.

If Texo_diff is greater than Texo_thres_pos, a 1 is produced at the output of comparator 38 whereas if Texo_diff is less than or equal to Texo_thres_pos; a 0 is produced at the output of comparator 38. Similarly, if Texo_diff is less than Texo_thres_neg, a 1 is produced at the output of comparator 40 whereas if Texo_diff is greater than or equal to Texo_thres_neg, a 0 is produced at the output of comparator 40.

The signal Texo_thres_pos from look up table 30 is fed to the negative input of summer 39 and the signal Texo_thres_neg is fed to a negative input of summer 41, as shown. Thus, the output of summer 39 is (Texo_diff)−(Texo_thres_pos) and the output of summer 41 is (Texo_diff)−(Texo_thres_neg), as indicated. The output of summer 39 is fed to the multiplier 43 along with the output of comparator 38. The output of summer 41 is fed to the multiplier 45 along with the output of comparator 40. The outputs of multipliers 43 and 45 are fed to the summer 47. The output of summer 47 is fed to the input of integrator 36. The output of integrator 36 is fed to the multiplier 43 to provided a time varying portion of the injector signal added to HC_NOM to together thereby provided the control signal for the injector 16.

Thus, if (Texo_diff) is greater than zero, the output of the summer 47, u, equals: (Texo_diff)−(Texo_thres_pos). Further, if Texo_diff is less than zero, the output of the summer 47, u, equals: (Texo_diff)−(Texo_thres_neg). It is noted that if Texo_diff is less than or equal to Texo_thres_pos and if Texo_diff is equal to or greater than Texo_thres_neg, the output of the summer 47 is zero. Thus, if Texo_diff is less than or equal to Texo_thres_pos and if Texo_diff equal to or greater than Texo_thres_neg the output of integrator maintains the output thereof and only changes its output if Texo_diff is greater than exo_thres_pos or if Texo_diff is less than Texo_thres_neg.

The output of the integrator Z(t) is fed to a multiplier 42 for multiplication with the scale factor k_i. The resulting product, k_i*Z(t) is algebraically summed with the HC_NOM in summer 48. The algebraic sum of HC_NOM and k_i*Z(t) provided the control signal on line 18 for the HC injector 16.

The reason integral control is used rather than proportional control is that we are trying to correct slowly (e.g., over months) changing biases due to injector aging, and the temperature dynamics are too slow to account for fast changes anyway.

Diagnostics

If Z>diag_thres_pos or Z<diag_thres_neg, it can be concluded that the injector is degraded (leaking or plugged, respectively) and the processor may cause the lighting of a warning light.

As noted above, while the processor 26 is shown functionally, such processor 26 is preferably a digital processor programmed in accordance with the following the flow chart:

FLOW CHART

Step 1. Look up: RPM, Mass Air Flow (MAF), nominal injected HG quantity, T_cat, SOI, EGR position
Step 2. Look up: Texo_expected (a function of HC quantity (i.e., HC_NOM), T_cat, MAF, etc)
Step 3. Measure: Texo_meas=T_downstream from sensor 24–T_upstream from sensor 22.
Step 4. Compare Texo_diff=Texo_meas–Texo_expected.
Step 5. Look up the allowable exotherm errors Texo_thres_pos and Texo_thres_neg which are functions of HC quantity (HC_NOM), T_cat, MAF, etc.
Step 6. Clip small errors in exotherm: DZ/dt 0 if Texo_diff <Texo_thres_pos and Texo_diff>Texo_thres_neg;
Step 7. Apply a dead zone to the error:

Compute u=Texo_diff–Texo_thres_pos if Texo_diff>0
u=Texo_diff–Texo_thres_neg if Texo_diff<0.

Step 8. Integrate the error:
dz/dt=u
Step 9. Limit the integrator to reasonable bounds:
y=sat(Texo_z_lmn, Texo_z_lmx)
HC quantity(i.e., the signal on line 18)=HC_NOM (RPM, fuel, SOI, T_cat, EGR, etc)+k_i*y
Step 10. Diagnostics:
If z>diag_thres_pos: injector is leaking (shown functionally by comparator 50 in the FIGURE).
If z<diag_thres_neg: injector is plugged (shown functionally by the comparator 52 in the FIGURE).

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining whether a hydrocarbon injector used to inject hydrocarbons into an engine exhaust to react with NOx in such engine exhaust is degraded, such method comprising:
   measuring an exotherm during the reaction;
   determining an exotherm difference, such exotherm difference being a difference between the measured exotherm and an expected exotherm;
   integrating the exotherm difference over time;
   comparing the integration result with predetermined level to detect whether the injector is degraded.

2. A system for determining whether a hydrocarbon injector used to inject hydrocarbons into an engine exhaust to react with NOx in such engine exhaust is degraded, such system comprising:
   a pair of temperature sensors disposed across the catalyst;
   a processor programmed to:
   determine, in response to the pair of sensors, a measured exotherm across the catalyst during the reaction;
   determine an exotherm difference, such exotherm difference being a difference between the measured exotherm and an expected exotherm across the catalyst during the reaction;
   integrate the exotherm difference over time; and
   compare the integration result with predetermined level to detect whether the injector is degraded.

3. A method for controlling injection of a reactant into an engine exhaust, such exhaust including NOx to be reacted with the reactant to reduce such NOx, such reaction being facilitated by a catalyst disposed downstream of the reactant injection, such method comprising:
   measuring an exotherm across the catalyst during the reaction;
   determining an exotherm difference, such exotherm difference being a difference between the measured exotherm and an expected exotherm across the catalyst during the reaction;
   adjusting an amount of hydrocarbon injection by integral control if the magnitude of the determined second temperature difference exceeds a threshold otherwise maintaining the amount of hydrocarbon injection level.

4. A method for controlling injection of a hydrocarbon into an engine exhaust, such exhaust including NOx to be reacted with the hydrocarbon to reduce such NOx, such reaction being facilitated by a catalyst disposed downstream of the hydrocarbon injection, such method comprising:
   measuring an exotherm across the catalyst during the reaction;
   determining an exotherm difference, such exotherm difference being a difference between the measured exotherm and an expected exotherm across the catalyst during the reaction;
   adjusting an amount of hydrocarbon injection if the magnitude of the determined second temperature difference exceeds a threshold otherwise maintaining the amount of hydrocarbon injection.

5. A system for controlling injection of a hydrocarbon into an engine exhaust, such exhaust including NOx to be reacted with the hydrocarbon to reduce such NOx, such system comprising:
   a pair of temperature sensors, one of such sensors being disposed upstream of the catalyst and the other one of the temperature sensors being disposed downstream of the catalyst;
   a processor for:
   in response to the pair of temperature sensors, determining an exotherm produced across the catalyst during the reaction;
   determining an exotherm difference, such exotherm difference being a difference between the determined exotherm and an expected exotherm across the catalyst during the reaction; and
   adjusting an amount of hydrocarbon injection if the determined exotherm difference exceeds a threshold level window, otherwise maintaining the amount of hydrocarbon injection level.

\* \* \* \* \*